United States Patent
Walker

(10) Patent No.: US 6,403,677 B1
(45) Date of Patent: Jun. 11, 2002

(54) AQUEOUS APPLICATION OF ADDITIVES TO POLYMERIC PARTICLES

(75) Inventor: Kenneth Raymond Walker, Billinge Wigan Lancs (GB)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/602,221

(22) Filed: Jun. 23, 2000

(30) Foreign Application Priority Data

Jun. 28, 1999 (GB) .............................. 9915039

(51) Int. Cl.$^7$ ................................. C08K 9/04
(52) U.S. Cl. ...................... 523/206; 523/205
(58) Field of Search ................. 524/603, 845, 524/291; 523/206, 334, 333, 205

(56) References Cited

U.S. PATENT DOCUMENTS

| | | | |
|---|---|---|---|
| 3,018,272 A | * | 1/1962 | Griffing et al. |
| 3,546,008 A | | 12/1970 | Shields et al. |
| 3,644,130 A | | 2/1972 | Evans et al. |
| 3,734,874 A | | 5/1973 | Kibler et al. |
| 3,779,993 A | | 12/1973 | Kibler et al. |
| 3,853,820 A | * | 12/1974 | Vachon ...................... 524/601 |
| 3,976,490 A | | 8/1976 | Macleish |
| 3,988,285 A | | 10/1976 | DeVrieze |
| 4,148,779 A | * | 4/1979 | Blackwell et al. .......... 524/601 |
| 4,250,081 A | | 2/1981 | Bode et al. |
| 4,307,077 A | | 12/1981 | Buck |
| 4,394,473 A | | 7/1983 | Winter et al. |
| 4,525,524 A | * | 6/1985 | Tung et al. ................. 524/603 |
| 4,675,122 A | | 6/1987 | Lüers et al. |
| 4,851,478 A | | 7/1989 | Su |
| 4,880,470 A | | 11/1989 | Hyche et al. |
| 4,898,616 A | | 2/1990 | Hyche et al. |
| 4,910,292 A | * | 3/1990 | Blount |
| 4,916,177 A | * | 4/1990 | Coney et al. ................ 524/602 |
| 5,007,961 A | | 4/1991 | Hyche et al. |
| 5,147,708 A | | 9/1992 | Brant et al. |
| 5,153,029 A | | 10/1992 | Sharma |
| 5,218,042 A | * | 6/1993 | Kuo ........................... 524/602 |
| 5,236,645 A | * | 8/1993 | Jones ......................... 264/211 |
| 5,300,256 A | | 4/1994 | Sharma |
| 5,322,885 A | * | 6/1994 | Kuo ........................... 524/601 |
| 5,380,590 A | * | 1/1995 | Nakamura et al. .......... 528/176 |
| 5,446,082 A | * | 8/1995 | Asai et al. .................. 524/601 |
| 5,449,707 A | | 9/1995 | Higashiura et al. |
| 5,543,488 A | * | 8/1996 | Miller et al. ................ 524/601 |
| 5,869,551 A | * | 2/1999 | Caswell et al. ............. 523/205 |
| 5,955,516 A | * | 9/1999 | Caswell et al. ............. 523/203 |

FOREIGN PATENT DOCUMENTS

| | | |
|---|---|---|
| EP | 0 364 331 A2 | 4/1990 |
| EP | 0 520 266 A1 | 12/1992 |
| WO | WO 99/03914 A1 | 1/1999 |

* cited by examiner

*Primary Examiner*—Peter Szekely
(74) *Attorney, Agent, or Firm*—Betty J. Boshears; Bernard J. Graves

(57) ABSTRACT

An aqueous composition and method for applying additives to polymeric particles includes a water-dissipatable polyester derived from a dicarboxylic acid component and a diol component and a difunctional monomer containing a $SO_3M$ moiety attached to an aromatic nucleus to at least partially disperse the additive. A method for dispersing a hydrophobic additive in an aqueous media includes the step of contacting the hydrophobic additive with an effective amount of the water-dissipatable polyester to form a mixture and agitating the mixture sufficiently to produce a homogenous blend is also described.

7 Claims, No Drawings

AQUEOUS APPLICATION OF ADDITIVES TO POLYMERIC PARTICLES

CROSS-REFERENCE TO RELATED APPLICATIONS

This application claims benefit to international application PCT/GB00/01423 filed Apr. 14, 2000 which claims priority to United Kingdom application 9915039.3 filed Jun. 28, 1999.

BACKGROUND OF THE INVENTION

The present invention relates to the aqueous application of additives to polymeric particles. Particularly, the invention relates to a composition and a method for applying additives to polymeric particles. More particularly, the composition and method for applying additives to polymeric particles includes using a water-dissipatable polyester derived from a dicarboxylic acid component and a diol component and a difunctional monomer containing a $SO_3M$ moiety attached to an aromatic nucleus. The composition and method of the invention are particularly suited for applying hydrophilic and/or hydrophobic materials to polymeric particles.

Numerous methods for introducing additives to polymeric particles are known to those skilled in the art. For example, additives such as antioxidants, processing aids, slip agents, antiblocking agents, antistatic agents, lubricants, UV stabilizers, coupling agents and colorants can be dry blended in either pellet or powder form or melt blended using an extruder or other suitable melt blending apparatus.

Some polymers are presently being manufactured with technology that does not lend itself to such techniques as melt compounding and pelletizing. Many polymers such as high density polyethylene, linear low density polyethylene, and polypropylene emerge from the polymerization reactor in a dry granular form, i.e., in a form similar to that of a fluidized bed system. Presently, additives for these polymers must be introduced by melting, compounding, and then pelletizing. This extra step increases the cost of such polymer manufacturing operations and can adversely affect the properties of such polymers.

Another method of introducing additives to polymeric particles is to contact such particles with an additive at the extruder hopper during end use processing, but before melt compounding or extrusion. Additives such as colorants, slip agents, processing aids, blowing agents, and others are introduced to virgin polymeric particles at this stage usually in concentrate form. In many instances, difficulty is encountered in metering the exact amounts of additive concentrate necessary to do a specific job. This is especially true for additives such as processing aids and external lubricants which are used at very low levels and usually cannot be added in a concentrate form.

Another method for coating polymeric particles, particularly polypropylene granules, with additives includes dispersing the additives in a solvent followed by removal of the solvent. While some stabilization is imparted to the coated polypropylene granules, the treated pellets have severe static electricity problems when subsequently processed.

It would be desirable to have available a simple process for applying additives to polymeric particles in order to enhance the stability of the particles without adversely affecting the physical properties and processability of the treated particles.

SUMMARY OF THE INVENTION

In accordance with the present invention, a wide range of additives, such as antioxidants or thermal stabilizers, colorants or the like can be applied to the surface of polymeric particles. Advantageously, the additives may be emulsified or dispersed in an aqueous system and used to coat the polymeric particles before normal drying or degassing operations. The additives may be applied using a variety of techniques such as, for example employing a spray, wipe, or dip system. Such aqueous systems may be formulated to treat polymeric particles which can then be formed into materials made from such particles. The resulting materials may be used in applications such as film or packaging for food, medicine and the like. Also, such aqueous systems may contain lubricants, mold release agents, antistatic agents and the like.

Briefly, the present invention includes an aqueous composition includes an additive, an effective amount of a water-dissipatable polyester, and from about 15 to about 95 weight % water.

Another aspect of the present invention is a method for applying various additives to a polymeric particle. The method includes the steps of contacting at least a portion of the polymer with the composition of the present invention having at least one additive included therein and drying the polymeric particles whereby at least a portion of the additive is retained on the polymeric particle.

Polymers which emerge from the polymerization reactor in particle form would substantially benefit from the application of such aqueous emulsions containing antioxidants and other additives by means of such an aqueous treatment. This means of introducing additives would eliminate melt compounding, lower production energy requirements, and minimize heat history on the polymer particles.

DETAILED DESCRIPTION OF THE INVENTION

In accordance with the present invention, an aqueous composition is provided for applying a variety of additives to polymeric particles. The aqueous composition includes at least one additive, an effective amount of a water-dissipatable polyester derived from a dicarboxylic acid component and a diol component and a difunctional monomer containing a $—SO_3M$ group attached to an aromatic nucleus to at least partially disperse the additive, and from about 5 weight % to about 95 weight % water, wherein the percentages are based on the total weight of the components in the aqueous composition.

Additives employed in the practice of the present invention include such materials as antioxidants, including, for example, hindered phenols, thioesters, organophosphites, and hindered amines, which may readily be dispersed or emulsified in the aqueous emulsion system. Additional additives contemplated by the present invention include coupling agents, antistatic agents, nucleating agents, metal deactivators, lubricants, slip agents, antiblocking agents, UV inhibitors, flame retardants, release agents, pigments, colorants, acetaldehyde reducing compound, reheat aids, and the like. More particularly, the additives employed in the practice of the present invention may be selected from antioxidants, e.g., tetrakis[methylene 3-(3',5'-di-tert-butyl-4'-hydroxyphenyl)propionate]methane, octadecyl 3-(3',5'-di-tert-butyl-4'-hydroxyphenyl)propionate, 1,3,5-trimethyl-2,4,6-tris-(3,5-di-tert-butyl)-4-(hydroxybenzyl)benzene, bis( 2,4-di-t-butylphenyl)pentaerythritol diphosphite, tris (mono nonylphenyl)phosphite, 4,4'-butylidene-bis(5-methyl-2-t-butyl)phenol, tris(3,5-di-t-butyl-4-hydroxybenzyl)isocyanurate, tris-nonylphenyl phosphite; distearyl pentaerythritol diphosphite; tetrakis-(2,4-di-t- butylphenyl)-4,4'-biphenylylene-diphosphonite; tris-(2,3-di-t-butylphenyl)phosphite; butylated hydroxy toluene; dicetyl thiodipropionate; dimyristyl thiodipropionate; poly (1,4-cyclohexylene-dimethylene-3,3'-thiodipropionate (partially terminated with stearyl alcohol); and the like; coupling agents, e.g., silanes; titanates; chromium complexes; low molecular weight polyolefins (with carboxylic moieties); high molecular weight polyolefins and acrylates (with carboxylic moieties); chlorinated paraffins; and the like; antistatic agents, e.g., glycerol monostearates; ethyoxylated amines; polyethylene glycol; quartemary ammonium compounds (salts); and the like; nucleating agents, e.g., sodium benzoate; diphenyl phosphinic acid (including magnesium, sodium, calcium, aluminum salts); phenyl phosphinic acid (including salts); phenyl phosphorous acid (including salts); and the like; metal deactivators, e.g., oxalyl bis-(benzylidene hydrazide); 2,2'-oxamido bis-(ethyl 3-(3,5-di-t-butyl-4-hydroxyphenyl)propionate; and the like; lubricants/slip agents/antiblocking agents, e.g., diatomaceous silica (earth); precipitated silica, silica gel, talc; clay; metallic stearates; alkyl bis-stearamids; glycerol monostearates; polyethylene glycol; erucamid; oleamid, and the like; UV inhibitors, e.g., 2-hydroxy-4-octoxybenzophenone; 2-hydroxy-4-isooctoxybenzophenone; 4-hydroxy-4-n-dodecyloxybenzophenone; 2-(3-di-t-butyl-2-hydroxy-5-methylphenyl-5-chlorobenzotriazole; 2-(2-hydroxy-3,5-di-t-amylphenyl)benzotriazole; p-t-butylphenyl salicyllate; 2,4-di-t-butylphenyl-3,5-di-t-butyl-4-hydroxybenzoate; nickel bis-ortho-ethyl(3,5-di-t-butyl-4-hydroxybenzyl) phosphonate; 2,2',6,6'-tetramethyl-4-piperidinyl sebacate, and the like; flame retardants, e.g., decabromodiphenyl oxide; dodecachlorodimethane dibenzocycloctane; ethylene bis-dibromo norbomane dicarboximide; ethylene bis-tetrabromophthalimide; antimony trioxide, and the like; biocides, e.g., methyl paraben, ethyl paraben, propyl paraben, halogenated alkyl organic compounds, transition metal carbamate salts, and the like; acetaldehyde reducing compounds such as polyamides, such as those disclosed in U.S. Pat. Nos. 5,650,469; 5,258,233; and 5,340,884, and reheat aids such as carbon black, antimony metal and IR absorbing dyes, such as those disclosed in the PCT publication U.S. Ser. No. 97/15351, the entire disclosures of each being incorporated herein by reference, as well as mixtures of any two or more of the above mentioned classes of compounds, or mixtures of two or more compounds from within a given class of compound.

The additives are present in the composition ranging from about 0.5 weight % to about 35 weight %, desirably from about 2 weight % to about 30 weight % and more desirably from about 5 weight % to about 25 weight %, based on the total weight of the constituents of the composition of the invention. The above additives are desirably used to coat the polymer particles in amounts ranging from about 10 ppm to about 20,000 ppm (2 weight %) and preferably from about 500 ppm to about 10,000 ppm (1 weight %) based on the total weight of the polymer.

One skilled in the art would understand the term "anti-blocking" as used herein to denote tacky homopolymeric or copolymeric materials that tend to block, adhere or congeal together in a nonpermanent but relatively strong bond after the materials have been formed into discrete particles or films and are placed in a face-to-face contact. Depending on the tackiness of the surface, the bond may be the result of time, pressure and temperature or any combination thereof. Depending upon the targeted end use of the polymer, it is probable that tackifying additives have been utilized to improve the cling properties of a film made from the polymer. Such additives include polybutenes terpene resins, alkali metal stearates and hydrogenated rosins and rosin esters.

The water-dissipatable polyester is essentially derived from the following components: A) at least one dicarboxylic acid; B) at least one diol where at least 20 mole percent of the diol is composed of an ethylene glycol having the fornula $H(OCH_2CH_2)_nOH$ where n is an integer of from two to about twenty; and C) at least one difuinctional dicarboxylic acid sulfomonomer containing a —$SO_3M$ group attached to an aromatic nucleus, wherein M is hydrogen or $Na^+$, $Li^+$, $K^+$, $Mg^{++}$, $Ca^{++}$, $Cu^{++}$, $Fe^{++}$, $Fe^{+++}$, or a combination thereof. The sulfomonomer component of the polyester constitutes from about 8 mole percent to about 45 mole percent of the total moles in constituents A–C. Such water-dissipatable polyesters are described in greater detail in U.S. Pat. No. 3,546,008 issued to Shields et al. and U.S. Pat. No. 3,779,993 issued to Kibler et al., the entire disclosures of which are incorporated herein by reference.

Generally, the dicarboxylic acid component of the water-dissipatable polyester can be any aliphatic, cycloaliphatic, or aromatic acid. Examples of such dicarboxylic acids include oxyalic; malonic; dimethylmalonic; succinic; glutaric; adipic; trimethyladipic; pimelic; 2,2-dimethylglutaric; azelaic; sebacic; fumaric; maleic; itaconic; 1,3-cyclopentanedicarboxylic; 1,2-cyclohexanedicarboxylic; 1,3-cyclohexanedicarboxylic; 1,4-cyclohexanedicarboxylic; phthalic terephthalic; isophthalic; 2,5-norbomanedicarboxylic; 1,4-naphthalic; diphenic; 4,4'-oxydibenzoic; diglycolic; thiodipropionic; 4,4'-sulfonyldibenzoic; and 2,5-naphthalenedicarboxylic acids.

It should be understood that the use of the corresponding acid anhydrides, esters, and acid chlorides of these acids are included in the term "dicarboxylic acid". The esters are preferred, examples of which include dimethyl 1,4-cyclohexanedicarboxylate; dimethyl 2,6-naphthalene dicarboxylate; dibutyl 4,4'-sulfonyldibenzoate, dimethyl isophthalate; dimethyl terephthalate; and diphenyl terephthalate. Copolyesters may be prepared from two or more of the above dicarboxylic acids or derivatives thereof.

At least 20 mole percent of the diol component used in preparing the linear water dissipatable polyester is a poly (ethylene glycol) having the formula $H(OCH_2CH_2)_nOH$ where n is an interger of from two to about twenty. Examples of preferred poly(ethylene glycols) include diethylene, triethylene, tetraethylene, pentaethylene, hexaethylene, heptaethylene, octaethylene, nonaethylene, decaethylene glycols and mixtures thereof. The remaining portion of the diol component is at least one aliphatic, cycloaliphatic, or aromatic diol. Examples of these diols include ethylene glycol; propylene glycol, 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; 1,2-cyclohexane-dimethanol; 1,3-cyclohexanedimethanol; 1,4-cyclohexane-dimethanol; 2,2,4,4-tetramethyl-1,3-cyclobutanediol; and p-xylylenediol.

The third constituent of the water-dissipatable polyester is a difunctional monomer containing a —$SO_3M$ group attached to an aromatic nucleus, wherein M is hydrogen or a metal ion and may be added directly to the reaction mixture from which the polyester or polyesteramide is made. This difunctional monomer component may be either a dicarboxylic acid, or derivative thereof, containing a —SO$_3$M group or a diol containing a —SO$_3$M group. The metal ion of the sulfonate salt group may be Na$^+$, Li$^+$, K$^+$, Mg$^{++}$, Ca$^{++}$, Cu$^{++}$, Fe$^{++}$, Fe$^{+++}$or combinations thereof. The —SO$_3$M moiety is attached to the aromatic nucleus, examples of which include benzene, naphthalene, anthracene, diphenyl, oxydiphenyl, solfonyldiphenyl, and methylenediphenyl.

The amount of water-dissipatable polyester present in the composition of the invention can range from about 5 weight % to about 50 weight %, preferably from about 15 weight % to about 50 weight % and more preferably from about 25 weight % to about 50 weight %, based on the total weight of the constituents in the composition.

One skilled in the polyester art will understand that by changing the proportions of the various acids which make up the dicarboxylic acid component of the polyester or polyesteramide, the properties of the polymer may be varied to meet specific end uses. For example, as the proportion of terephthalic acid is decreased, the polymer becomes more flexible. Moreover, varying the mole percentages of sulfonate-containing difunctional monomer varies the water susceptibility of the polymer.

The amount of water used to form the aqueous composition is from about 5 weight % to about 95 weight % and preferably from about 10 weight % to about 90 weight % and more preferably from about 10 weight % to about 85 weight %, based on the total weight of the constituents in the aqueous composition. The water used to form the composition may further contain additives such as antioxidants, processing aids, slip agents, antiblocking agents, lubricants and the like that, preferably, are hydrophilic.

Some preferred polymeric particles which may be coated using the composition and method of the present invention include, for example, polyolefins such as crystalline polypropylene, low density polyethylene, high density polyethylene and linear low density polyethylenes Other polymeric materials include, for example, polystyrene, polyesters, polyamides and the like as well as copolymers such as crystalline propylene ethylene copolymers, rubbers such as ethylene propylene rubber and the like. The polymeric particles suitable for being contacted with the aqueous composition of the present invention can be in the form of beads, powder, pellets and the like.

Advantageously, and quite unexpectedly, the composition of the present invention allows the coating of polymeric particles using an aqueous dispersion for hydrophobic materials. Additionally, the aqueous composition and method of the invention may be used to coat materials having a surface energy from about 25 to about 45 dynes/cm. Preferably, the aqueous composition and method of the invention may be used to coat materials having a surface energy from about 25 to about 40 dynes/cm, and more preferably from about 25 dynes/cm to about 35 dynes/cm.

In accordance with another embodiment of the present invention, there is provided a method for applying additives to polymeric particles. The method includes the steps of contacting the particles with the above-described composition having at least one additive and optionally drying the resulting particles.

In accordance with another embodiment of the invention there is provided a method for dispersing a hydrophobic additive in an aqueous media. The method includes the steps of providing and contacting the hydrophobic additive with an effective amount of the water-dissipatable polyester described above to form a mixture and agitating the mixture sufficiently to produce a homogenous blend.

The aqueous composition of the present invention can be dispersed in an aqueous media in large quantities, upwards of about 50 weight % solids. Preferred loading levels fall in the range of about 5 weight % to about 25 weight % based on the total weight of the polymer additives and aqueous media. Typically, the loading level is from sufficient to impart from about 500 ppm to about 1 weight % of the additive onto the polymeric particles.

The invention can be further illustrated by the following non-limiting examples. It will be understood that these examples are included merely for purposes of illustration and are not intended to limit the scope of the invention unless otherwise specifically indicated.

These experiments use an aqueous dispersion or emulsion to allow a water insoluble hydrophobic solid to be incorporated into water to form a stable dispersion. If the stabilizing emulsion or dispersion was not present, the insoluble solid would be mixed into the water but would rapidly separate to form a distinct layer. The percentages are by weight unless otherwise specified.

COMPARATIVE EXAMPLE 1

In an appropriate container, a homogenous additive blend was prepared by mixing together the constituents of Table 1 below and in the amounts shown. The constituents were blended using a high speed Ultra Turrax mixer, available from IKA Werke, Janke & Kunkel GmbH & Co. Staufen, Germany.

TABLE 1

| Ingredient | Amount (weight %) |
| --- | --- |
| Wax Emulsion[1] | 27.0 |
| Pharmasorb Regular | 40.0 |
| Tergitol 15-S-7[2] | 1.5 |
| Span 60[3] | 0.5 |
| SE21 antifoam[4] | 0.3 |
| Amerstat 251[5] | 0.08 |
| Aerosol OT 70 PG[6] | 1.0 |
| Water | 29.62 |

[1]The wax emulsion was prepared according to the method described in U.S. Pat. No. 4,880,470, Example 1. This consisted of 40 parts by weight of a low molecular weight oxidised polyethylene wax having an acid number of about 15–17, 11 parts by weight Tergitol 15-S-9 from Union Carbide, 0.9 parts by weight of potassium hydroxide (86%), 0.4 parts by weight sodium metabisulfite, and 150 parts by weight of water.
[2]Tergitol 15-S-7 is available from Union Carbide, USA.
[3]Span 60 is available from ICI, UK.
[4]SE21 is available from Wacker, Germany.
[5]Amerstat 251 is available from Ameroid, UK.
[6]Aerosol OT 70 PG is available from Cytec, France.

To evaluate the efficacy of the blend in applying an additive to the surface of a polymer, a Kaolin clay based organic filler, Pharmasorb Regular (available from Lawrence Industries, UK) was used as an antiblocking additive. This material was chosen for the evaluation since it is brown in color and would allow visual appraisal of the coating efficiency on the polymer surface.

Five hundred grams (500 g.) of polyethylene vinylacetate, available from Bayer Germany, in the form of pastilles having a diameter of about 5 mm was cleaned of any silica antiblocking coating using detergent and water. The cleaned polyethylene vinylacetate was dried and placed into a polyethylene bag. Approximately 12.5 grams of the blend of Table 1 was poured into the polyethylene bag to give an additive add-on of about 10,000 ppm (1 weight %). The bag was sealed, shaken by hand for 30 seconds to mix the polymer and mixture. The coated polymer was poured into a porous tray and allowed to dry at room temperature.

After drying, the polymer was evaluated over a period of several days to determine if the pastilles were free flowing (in which case the anti-blocking additive formulation was successful) or whether the pastilles has stuck together (in which case the anti-blocking formulation was unsuccessful). The coating efficiency of this blend was found to be unacceptable.

EXAMPLE 1

In accordance with the present invention, the procedure of Comparative Example 1 above was repeated except the constituents of the additive blend were those in Table 2 and in the amounts shown.

TABLE 2

| Ingredient | Amount (weight %) |
| --- | --- |
| AQ29D[1] | 30.0 |
| Pharmasorb Regular | 30.0 |
| Water | 40.0 |

[1]AQ29D is a sulfopolyester available from Eastman Chemical Company, Kingsport, Tennessee, United States of America.

After drying, the polymer was evaluated over a period of several days to determine if the pastilles were free flowing (in which case the anti-blocking additive formulation was successful) or whether the pastilles has stuck together (in which case the anti-blocking formulation was unsuccessful). The coating efficiency of this blend was found to not reach the required standard. Although the antiblocking effectiveness of both coatings were not acceptable, the AQ29D sample was significantly better than the coating of Comparison Example 1. The pastilles exhibited improved flow and anti-sticking properties when measured over a storage period of several weeks.

COMPARISON EXAMPLE 2

In an appropriate container, a homogenous additive blend was prepared by mixing together the constituents of Table 3 below and in the amounts shown. The constituents were blended using a high speed Ultra Turrax mixer.

TABLE 3

| Ingredient | Amount (weight %) |
| --- | --- |
| Wax Emulsion | 27.0 |
| Synpro 15 Calcium Stearate[1] | 40.0 |
| Tergitol 15-S-7 | 1.5 |
| Span 60 | 0.5 |
| SE21 antifoam | 0.3 |
| Amerstat 251 | 0.08 |
| Aerosol OT 70 PG | 1.0 |
| Water | 29.62 |

[1]Synpro 15 Calcium Stearate is available from Witco, USA.

Synpro 15 calcium stearate was used as an antiblocking additive to coat 500 g. of polyethylene vinylacetate prepared as described above in Comparative Example 1. The blend of Table 3 was poured into the polyethylene bag to give an additive add-on of about 5,000 ppm. The bag was sealed, shaken by hand for 30 seconds to mix the polymer and mixture. The coated polymer was poured into a porous tray and allowed to dry at room temperature.

After drying, the polymer was evaluated over a period of several days. It was found that at additive levels of 5,000 ppm, the pastilles coalesced and were not easily separated from each other. At an increased loading of 10,000 ppm, the pastilles were free flowing without evidence of sticking and coalescence.

COMPARATIVE EXAMPLE 3

The additive blend of Comparative Example 2 was used to coat polybutadiene, obtained from Repsol, Spain. The polybutadiene was prepared by cutting a block of the material into cubes of approximately 5 mm in size. The polybutadiene cubes were coated with the additive blend of Table 3 in the manner described above in Comparative Example 2 to give an additive add-on of about 5,000 ppm.

After drying, the polymer was evaluated over a period of several days. It was found that the polymer cubes has coalesced into one continuous mass indicating that the formulation shown in Table 3 was inefficient as an anti blocking formulation on polybutadiene.

EXAMPLES 2 AND 3

In accordance with the present invention, a homogenous additive blend was prepared by mixing together the constituents of Table 4 below and in the amounts shown. The constituents were blended using a high speed Ultra Turrax mixer.

TABLE 4

| Ingredient | Amount (weight %) |
| --- | --- |
| AQ29D | 22.5 |
| Synpro 15 Calcium Stearate | 30.0 |
| Water | 47.5 |

The additive blend was used to coat polyethylene vinylacetate and polybutadiene prepared as described above, respectively. The polyethylene vinylacetate and polybutadiene coated with the additive blend of Table 4 in the manner described above in Comparative Example 2 to give an additive add-on of about 5,000 ppm.

After drying, the polymers were evaluated over a period of several days and were found to be free flowing and consisting of separate non-sticky particles.

From the examples it is apparent that the additive compositions based on the sulfopolyester gave improved results compared to the emulsifiable wax based formulations.

Although the present invention has been described in terms of the presently preferred embodiment, it is to be understood that such disclosure is not to be interpreted as limiting to the invention described herein. No doubt that after reading the disclosure, various alterations and modifications will become apparent to those skilled in the art to which the invention pertains. It is intended that the appended claims be interpreted as covering all such alterations and modifications as fall within the spirit and scope of the invention.

I claim:

1. A method for surface coating additives to polymeric particles comprising the steps of:
    a) providing an aqueous composition comprising:
        i) a hydrophobic additive for coating at least a portion of said polymeric particle selected from the group consisting of coupling agents, antistatic agents, nucleating agents, metal deactivators, lubricants, slip agents, antiblocking agents, and mixtures thereof;

ii) from about 5 to about 50 weight % of a water-dissipatable polyester derived from a dicarboxylic acid component and a diol component and a difimctional monomer containing a $SO_3M$ group attached to an aromatic nucleus to at least partially disperse said additive, wherein M is selected from the group consisting of is hydrogen, $Na^+$, $Li^+$, $K^+$, $Mg^{++}$, $Ca^{++}$, $Cu^{++}$, $Fe^{++}$, $Fe^{+++}$, or a combination thereof; and iii) from about 5 weight % to about 95 weight % water, wherein said percentages are based on the total weight of the components i–iii;

b. contacting said polymeric particles with said aqueous composition; and c. drying the resulting polymeric particles, and wherein said polymeric particles have a surface energy of from about 25 dynes/cm to about 45 dynes/cm.

2. The method of claim 1 wherein said polymeric particle has a surface energy of from about 25 dynes/cm to about 40 dynes/cm.

3. The method of claim 1 wherein said polymeric particle has a surface energy of from about 25 dynes/cm to about 35 dynes/cm.

4. The method of claim 1 wherein said polymeric particle is selected from the group consisting of polypropylene, polyethylene, polystyrene, polyesters, polyamides; propylene ethylene copolymers; rubber and mixtures thereof.

5. A method for surface coating tacky polymeric particles with antiblocking agents comprising the steps of:

a) providing an aqueous composition comprising:

i) an antiblocking additive selected from the group consisting of clay, calcium stearate and mixtures thereof;

ii) from about 5 to about 50 weight % of a water-dissipatable polyester derived from a dicarboxylic acid component and a diol component and a difunctional monomer containing a $SO_3M$ group attached to an aromatic nucleus to at least partially disperse said additive, wherein M is selected from the group consisting of is hydrogen, $Na^+$, $Li^+$, $K^+$, $Mg^{++}$, $Ca^+$, $Cu^{++}$, $Fe^{++}$, $Fe^+$, or a combination thereof; and iii) from about 5 weight % to about 95 weight % water, wherein said percentages are based on the total weight of the components i–iii;

b. contacting said polymeric particles with said aqueous composition; and c. drying the resulting polymeric particles, and wherein said polymeric particles have a surface energy of from about 25 dynes/cm to about 45 dynes/cm.

6. The method of claim 5 wherein said polymeric particle is selected from the group consisting of polypropylene, polyethylene, polystyrene, polyesters, polyamides; propylene ethylene copolymers; rubber and mixtures thereof.

7. The method of claim 5 wherein said additive ranges from about 0.5 weight % to about 35 weight % of said blend.

* * * * *